United States Patent
Lindsey

(10) Patent No.: US 9,972,880 B2
(45) Date of Patent: May 15, 2018

(54) METHOD FOR BUILDING A CONNECTION BETWEEN A COAXIAL RF CABLE AND HYBRID PACKAGE USING 3D PRINTING AND A CONNECTION RECEPTACLE

(71) Applicant: Keysight Technologies, Inc., Minneapolis, MN (US)

(72) Inventor: John R. Lindsey, Colorado Springs, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days. days.

(21) Appl. No.: 14/718,124

(22) Filed: May 21, 2015

(65) Prior Publication Data

US 2016/0020501 A1    Jan. 21, 2016

Related U.S. Application Data

(60) Provisional application No. 62/025,188, filed on Jul. 16, 2014.

(51) Int. Cl.
*H01R 43/00* (2006.01)
*H01P 5/08* (2006.01)
*B33Y 80/00* (2015.01)

(52) U.S. Cl.
CPC .............. *H01P 5/085* (2013.01); *B33Y 80/00* (2014.12); *Y10T 29/49117* (2015.01)

(58) Field of Classification Search
CPC ............ G01R 1/06711; G01R 1/06738; Y10T 29/49204; Y10T 29/53213; Y10T 29/49117; H01P 5/085; H02G 15/085
USPC .......... 29/850, 600, 825, 829, 846; 428/428, 428/432, 901; 439/63, 581
See application file for complete search history.

(56) References Cited

U.S. PATENT DOCUMENTS

| | | | |
|---|---|---|---|
| 4,748,085 A * | 5/1988 | Fukuda ................. | C04B 35/111 257/E23.009 |
| 4,995,815 A * | 2/1991 | Buchanan ............ | H01R 9/0515 333/260 |
| 6,000,120 A * | 12/1999 | Arledge ................ | H01P 11/005 29/600 |
| 6,255,730 B1 | 7/2001 | Dove et al. | |
| 8,542,079 B2 | 9/2013 | Sherrer et al. | |

* cited by examiner

*Primary Examiner* — Thiem Phan

(57) ABSTRACT

A method of forming a connection receptacle over a substrate includes printing a first dielectric layer over the substrate between first and second transmission lines, the first dielectric layer having a tapered cross-section along a plane extending from the first transmission line to the second transmission line; disposing a conductive layer over the printed first dielectric layer; and electrically connecting the conductive layer to a conductor of the first transmission line and a conductor of the second transmission line.

12 Claims, 7 Drawing Sheets

METHOD FOR BUILDING A CONNECTION BETWEEN A COAXIAL RF CABLE AND HYBRID PACKAGE USING 3D PRINTING AND A CONNECTION RECEPTACLE

CROSS-REFERENCE TO RELATED APPLICATIONS

The present application claims priority under 35 U.S.C. § 119(e) from commonly owned U.S. Provisional Application No. 62/025,188 filed on Jul. 16, 2014 to John R. Lindsey. The entire disclosure of U.S. Provisional Application No. 62/025,188 is specifically incorporated herein by reference.

BACKGROUND

High frequency signals, such as radio frequency (RF) signals and microwave signals, are often carried over coaxial cables and waveguides between subassemblies, to external connections, and within subassemblies to and from printed circuit (PC) boards, hybrid packages and outside instruments. Signals on boards and packages may be carried over transmission lines or structures such as quasi-coaxial structures, co-planar waveguides, microstrips and striplines, for example. For any RF signal-carrying structure there is a characteristic impedance which should be consistent and controlled throughout such a system. Often this characteristic impedance is set to $z_o = 50\Omega$. The characteristic impedance is determined by material properties such as conductivity, permittivity and permeability, as well as the geometry of the RF signal carrying structure. An additional factor that may also help to determine how well a structure carries RF signals relates to the dielectric loss of insulator materials.

The signal quality of such a system may be degraded at any place in the system where the characteristic impedance varies from 50Ω. Variations in geometry or material properties can cause changes in impedance, resulting in signal quality degradation of the system. For example, the characteristic impedance may vary locally from 50Ω at a transition between one 50Ω line and another 50Ω line if the structures have different geometries or are made of different materials. The variation in characteristic impedance at a transition between two 50Ω structures may be minimized if the material properties and/or geometries vary gradually in the transition between the two 50Ω structures.

Some systems may include matching connectors on the RF cable and on the sub-assembly or package that can be relatively expensive. For instance, excluding manufacturing costs associated with installation, some assemblies using ceramic hybrid packages may include two RF connectors which together may account for almost 15% of the total sub-assembly or package cost. As connector cost roughly scales with frequency, the costs associated with higher frequency connectors and components operating beyond 50 GHz may be substantially greater.

Moreover, installation of the connectors on the sub-assembly or package may be difficult and error-prone, leading to re-work, low yield, and breakage. The overall cost associated with the connectors may thus be much greater than the cost of the connector itself.

Regardless, these connectors may not provide a gradual transition in geometry and/or materials, leading to deviations from the desired 50Ω signal path. The result may be signal degradation at the connectors.

A connection for use with ceramic hybrids may entail soldering a through connector to the back of the ceramic hybrid. The inner signal wire of the through connector may be wire bonded to the upper surface of the ceramic hybrid. Although such through connectors may be relatively less expensive, a 90-degree bend may be created in the signal path of the inner signal wire. Because RF signals do not follow sharp bends effectively at higher frequencies, due to signal degradation this approach tends to limit frequency performance to about 30 GHz. Moreover, the production costs of processing vias with through connectors are typically high.

Other connections may include printed connector assemblies built with micro-electro-mechanical systems (MEMS)-type processing using sacrificial materials. However, 90 degree bends may be created in the signal path, limiting signal frequency to about 30 GHz. Also, MEMS-type processing is expensive, and building full 3-dimensional structures required to match 3-dimensional RF cables may be difficult. Very little geometrical and/or material transition may be provided by an RF MEMS structure, resulting in signal loss and disruption. Also, the connectors necessary to provide attachment to the cables are expensive, especially for applications at high frequencies.

There is therefore a need to provide a cost effective, high signal-quality connection, and method for building connections, between RF carrying signal structures.

SUMMARY

In a representative embodiment, a method of forming a connection receptacle on a substrate includes printing a first dielectric layer over the substrate between first and second transmission lines, the first dielectric layer including a tapered cross-section along a plane extending from the first transmission line to the second transmission line; disposing a conductive layer over the printed first dielectric layer; and electrically connecting the conductive layer to a conductor of the first transmission line and a conductor of the second transmission line.

In another representative embodiment, a connection receptacle on a substrate includes a printed first dielectric layer over the substrate between first and second transmission lines; and a conductive layer over the printed first dielectric layer, the conductive layer including first and second ends respectively electrically connected to a conductor of the first transmission line and a conductor of the second transmission line, the printed first dielectric layer including a tapered cross-section along a plane extending from the first transmission line to the second transmission line.

BRIEF DESCRIPTION OF THE DRAWINGS

The illustrative embodiments are best understood from the following detailed description when read with the accompanying drawing figures. Wherever applicable and practical, like reference numerals refer to like elements.

DETAILED DESCRIPTION

Figure 1:
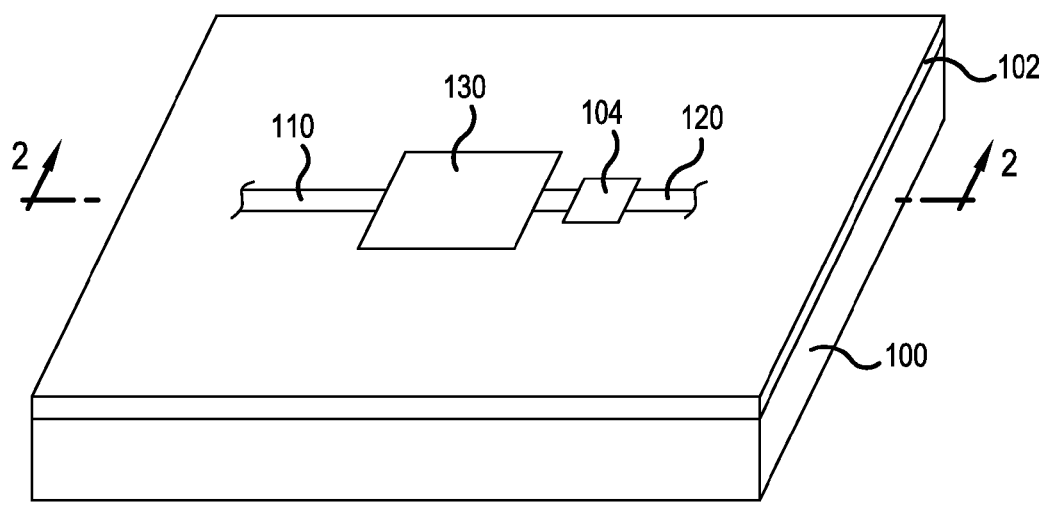
FIG. 1 is a perspective view illustrating a connection receptacle over a substrate between a first transmission line and a second transmission line, according to a representative embodiment.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings. Generally, it should be understood that the drawings and various elements and/or layers depicted are not drawn to scale.

Generally, it should be understood that the drawings and the various elements depicted therein may not necessarily be drawn to scale, and that some of the layers or dimensions may be exaggerated to better emphasize certain features. Further, relative terms, such as "above," "below," "top," "bottom," "upper," "lower," "left," "right," "vertical" and "horizontal," are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

Generally, it should also be understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable.

As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

FIG. 1 is a perspective view illustrating connection receptacle 130 over substrate 100 between first transmission line 110 and second transmission line 120, according to a representative embodiment. In a representative embodiment, connection receptacle 130, first transmission line 110 and second transmission line 120 may be disposed over substrate 100 on ground plane 102. In other representative embodiments, hold-down 104 may be included to secure second transmission line 120 to substrate 100.

Figure 2:
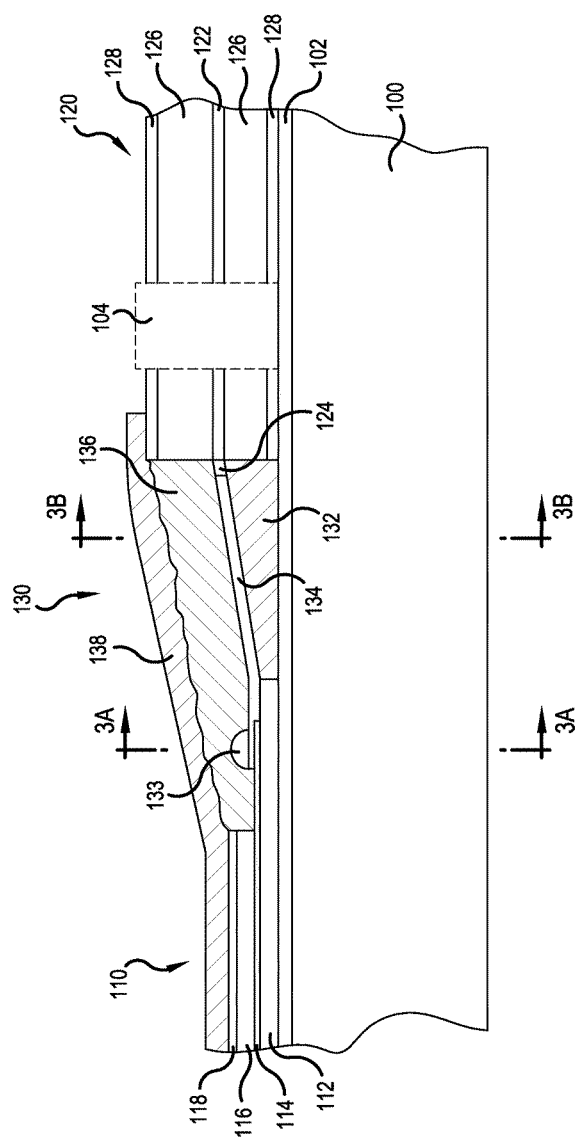
FIG. 2 is a cross-sectional view illustrating the connection receptacle, the first transmission line and the second transmission line of FIG. 1, according to a representative embodiment.

FIG. 2 is a cross-sectional view illustrating connection receptacle 130, first transmission line 110 and second transmission line 120 shown in FIG. 1, according to a representative embodiment.

Referring to FIGS. 1 and 2, first transmission line 110, connection receptacle 130 and second transmission line 120 are disposed on or over substrate 100. In a representative embodiment, substrate 100 may be a printed circuit (PC) board, a hybrid package, an integrated circuit (IC) chip, or an RF cable assembly. Substrate 100 may thus be made of materials such as alumina ceramic, aluminum nitride ceramic, glass-reinforced epoxy laminate sheets or polytetrafluoroethylene (PTFE), and may have a thickness in a range of about 0.005" to 0.050" depending on the specific application, for example. In a representative embodiment, ground plane 102 may be disposed on an upper surface of substrate 100 and may be a metal such as gold, silver or copper. Ground plane 102 may have a thickness in a range of about 0.00025" to 0.0025".

As shown in FIG. 2, first transmission line 110 is disposed over substrate 100 on ground plane 102. In the representative embodiment as shown in FIG. 2, first transmission line 110 is a quasi-coaxial structure configured as including bottom dielectric layer 112 on or over ground plane 102, center conductor (conductor) 114 on or over bottom dielectric layer 112, and top dielectric layer 116 on or over center conductor 114. Bottom and top dielectric layers 112 and 116 may be thick film dielectric such as $SiO_2$, $Al_2O_3$, KQ thick film dielectric material available from Heraeus Materials Technology, 4141A or AlN44 thick film dielectric material available from DuPont, or organics such as PTFE, for example. Center conductor 114 may be a metal such as gold, silver or copper. First transmission line 110 may have a thickness in a range of about 0.002" to 0.02" and a width in a range of about 0.005" to 0.05". As further shown in FIG. 2, a portion of top dielectric layer 116 is removed to expose a portion of center conductor 114. First transmission line 110 may also include conductive layer 118 that is on or over top dielectric layer 116 and that is connected to ground. Conductive layer 118 may be a metal such as gold, silver or copper. In some representative embodiments first transmission line 110 may be provided without conductive layer 118. In still further representative embodiments, first transmission line 110 may be a co-planar waveguide, a microstrip, or a stripline.

As further shown in FIG. 2, second transmission line 120 is also disposed over substrate 100 on ground plane 102. In this representative embodiment, second transmission line 120 is a radio frequency (RF) cable including a center conductor (conductor) 122 which is surrounded by dielectric 126, and an outer conductive layer or sheath 128 surrounding dielectric 126. The outer conductive layer or sheath 128 may be electrically connected to ground. The RF cable may have a diameter in a range of about 0.015" to 0.250". Center conductor 122 may have a diameter in a range of about 0.010" to 0.050", and may extend out from second transmission line 120 as protruding conductor portion 124. Protruding conductor portion 124 may have a length in a range of about 0.005" to 0.050". Second transmission line 120 may be laterally spaced away from first transmission line 110 by a distance of about 0.050" to 0.250". In a representative embodiment hold-down 104, as shown by dashed lines in this cross-sectional view, may be included and configured to mechanically secure second transmission line 120 to substrate 100. Hold-down 104 may be a dielectric disposed over transmission line 120 and on substrate 100, to secure second transmission line 120 to substrate 100. In other representative embodiments, hold-down 104 may be either of a conductive epoxy or a non-conductive epoxy disposed or dispensed over second transmission line 120 and on substrate 100, to secure second transmission line 120 to substrate 100.

Referring further to FIG. 2, connection receptacle 130 is disposed over substrate 100 on ground plane 102, between first and second transmission lines 110 and 120. Connection receptacle 130 includes first dielectric layer 132 on or over ground plane 102, conductive layer 134 on or over first dielectric layer 132, and second dielectric layer 136 on or over first dielectric layer 132 and conductive layer 134. Conductive layer 134 has first and second ends respectively electrically connected to a conductor of first transmission line 110 and a conductor of second transmission line 120. First and second dielectric layers 132 and 136 may be thick film dielectric such as $SiO_2$, $Al_2O_3$, KQ thick film dielectric material available from Heraeus Materials Technology, 4141A or AlN44 thick film dielectric material available from DuPont, or organics such as PTFE, for example. First dielectric layer 132 has a tapered cross-section along a plane extending from first transmission line 110 to the second transmission line 120. That is, the thickness or height (in the y-direction shown in FIG. 4A) of first dielectric layer 132 may gradually change along a lateral direction (the x-direction shown in FIG. 4A) from first transmission line 110 to second transmission line 120, minimizing abrupt transitions. As shown in FIG. 2, the thickness (in the y-direction) of first dielectric layer 132 gradually increases along the lateral direction from first transmission line 110 to second transmission line 120 due to the different respective geometries of first and second transmission lines 110 and 120. In other representative embodiments, the thickness of first dielectric layer 132 may gradually decrease along the lateral direction from first transmission line 110 to second transmission line 120 if first transmission line 110 is relatively larger or thicker than second transmission line 120. Also, in some representative embodiments second dielectric layer 136 may have a tapered cross-section along the plane extending from first transmission line 110 to the second transmission line 120. That is, the thickness or height (in the y-direction) of second dielectric layer 136 may gradually change along a lateral direction (in the x-direction) from first transmission line 110 to second transmission line 120, minimizing abrupt transitions. In other representative embodiments, second dielectric layer 136 may not have a tapered cross-section. In some representative embodiments any or all of the respective widths (in the z-direction) of first dielectric layer 132, conductive layer 134 and second dielectric layer 136 may gradually change, such as shown in FIG. 4D where the respective widths (in the z-direction) of first dielectric layer 132 and conductive layer 134 gradually increase for example.

Conductive layer 134 may be a metal such as gold, silver or copper. In a representative embodiment, first dielectric layer 132 may have a center channel 135 (shown in FIG. 3B) disposed along a top surface and extending laterally between first transmission line 110 and second transmission line 120. Conductive layer 134 may be disposed within or inserted into center channel 135 (as shown in FIG. 3B). Conductive layer 134 is electrically connected to the exposed portion of center conductor 114 of first transmission line 110 and is electrically connected to protruding conductor portion 124 of second transmission line 120. In a representative embodiment, conductive layer 134 may be electrically connected to the exposed portion of center conductor 114 by solder 133. Conductive layer 134 may also be electrically connected to protruding conductor portion 124 by solder. In other representative embodiments, conductive layer 134 may be electrically connected to the exposed portion of center conductor 114 and protruding conductor portion 124 by conductive epoxy. Also, although not necessary, conductive layer 134 may have a tapered cross-section along the plane extending from first transmission line 110 to the second transmission line 120 as specifically shown in FIG. 2. That is, the thickness of conductive layer 134 may gradually change along a lateral direction from first transmission line 110 to second transmission line 120, without abrupt transitions. Also, the width of conductive layer 134 may gradually change (such as shown in FIG. 4D for example). In other representative embodiments, conductive layer 134 may not have a tapered cross-section.

Referring further to FIG. 2, shield layer 138 is disposed on second dielectric layer 136. In a representative embodiment, shield layer 138 may overlap onto first transmission line 110 and/or transmission line 120. Shield layer 138 is configured to substantially enclose first dielectric layer 132 (which may be characterized as a printed first dielectric layer), conductive layer 134 and second dielectric layer 136 on or over substrate 100. In a representative embodiment, shield layer 138 may also substantially enclose at least portions of first transmission line 110 and/or second transmission line 120 on or above substrate 100. Shield layer 138 may be a conductive metal such as gold, silver or copper or a conductive material such as silver-filled epoxy and may also be electrically connected to conductive layer 118 and outer conductive layer or sheath 128 (which may be respectively characterized as outer conductive layers of first and second transmission lines 110 and 120). In other representative embodiments, shield layer 138 may be electrically non-conductive.

Figure 3A:
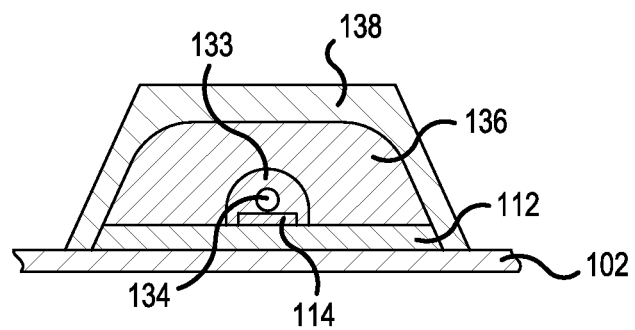
FIG. 3A is a cross-sectional view illustrating the connection receptacle of FIG. 2, according to a representative embodiment.
Figure 3B:
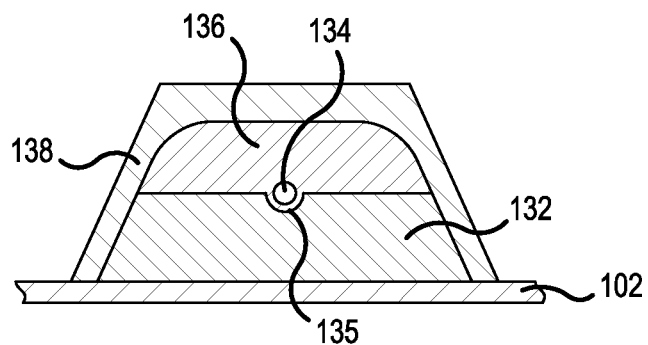
FIG. 3B is another cross-sectional view illustrating the connection receptacle of FIG. 2, according to a representative embodiment.

FIG. 3A is a cross-sectional view illustrating connection receptacle 130 of FIG. 2, according to a representative embodiment. FIG. 3B is another cross-sectional view illustrating connection receptacle 130 of FIG. 2, according to a representative embodiment.

The cross-sectional view of FIG. 3A shows bottom dielectric layer 112 of first transmission line 110 disposed on ground plane 102, center conductor 114 and conductive layer 134 electrically connected together by solder 133, and second dielectric layer 136 disposed on bottom dielectric layer 112 and solder 133. At the particular cross-section shown in FIG. 3A, shield layer 138 is disposed on top and side surfaces of second dielectric layer 136, and on side surfaces of bottom dielectric layer 112, and therefore is configured to enclose first transmission line 110 and second dielectric layer 136 and to be electrically connected to ground plane 102 on or above substrate 100.

The cross-sectional view of FIG. 3B shows first dielectric layer 132 disposed on ground plane 102, conductive layer 134 disposed within center channel 135, and second dielectric layer 136 disposed over conductive layer 134 and first dielectric layer 132. At the particular cross-section shown in FIG. 3B, shield layer 138 is disposed on top and side surfaces of second dielectric layer 136, and on side surfaces of first dielectric layer 132, and therefore is configured to enclose first dielectric layer 132 and second dielectric layer 136 and to be electrically connected to ground plane 102 on or above substrate 100.

As should also be understood in view of FIGS. 3A and 3B as taken with FIG. 2, first dielectric layer 132 has a tapered cross-section along the plane extending from first transmission line 110 to the second transmission line 120, whereby the thickness (or height) of first dielectric layer 132 gradually changes along a lateral direction from first transmission line 110 to second transmission line 120 without abrupt transitions.

Figure 4A:
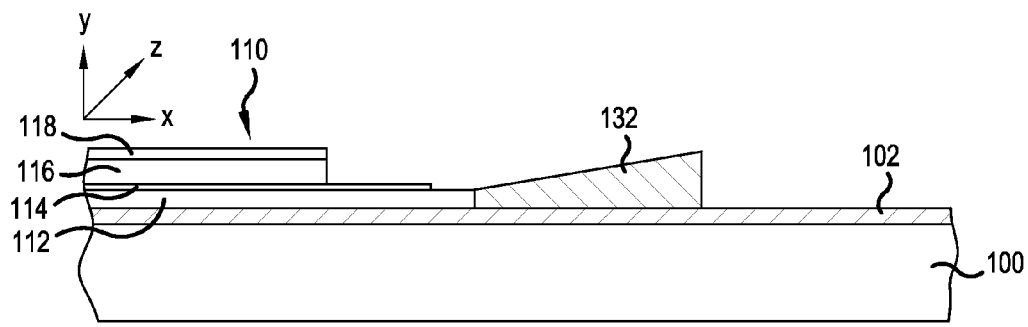
FIGS. 4A-4C are cross-sectional views.
Figure 4B:
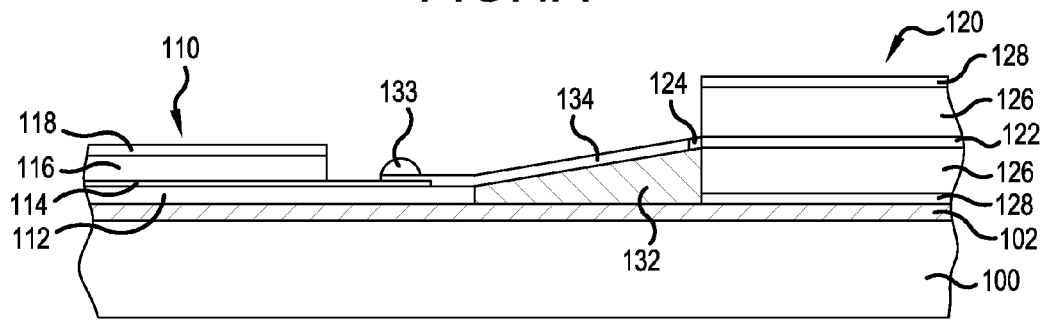
Figure 4C:
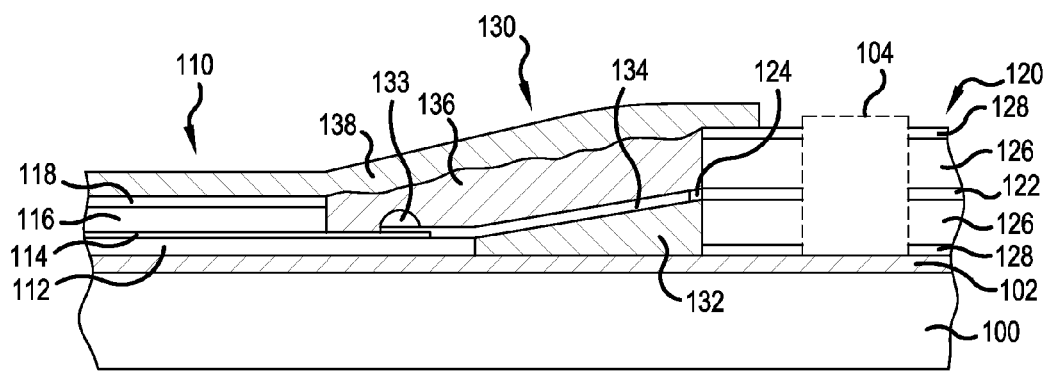
Figure 4D:
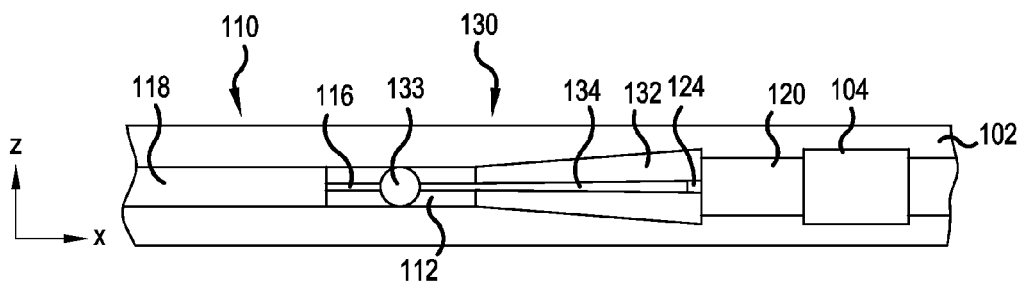
FIG. 4D is a top perspective view, illustrating a method of forming a connection receptacle over a substrate between a first transmission line and a second transmission line, according to a representative embodiment.

FIGS. 4A-4C are cross-sectional views, and FIG. 4D is a top perspective view, illustrating a method of forming connection receptacle 130 over substrate 100 between first transmission line 110 and second transmission line 120, according to a representative embodiment.

Referring to FIG. 4A and FIG. 2, ground plane 102 may be formed as a metal layer on an upper surface of substrate 100 by thick film screen printing, sputtering, evaporation, or any other known processing technique. Thereafter, first transmission line 110 may be formed over substrate 100 on ground plane 102. In this representative embodiment, first transmission line 110 is a quasi-coaxial structure which may be formed by sequentially and repeatedly screen printing and firing thick film materials, or by depositing, patterning and etching corresponding layers to form bottom dielectric layer 112 over substrate 100 on ground plane 102, center conductor 114 on or over bottom dielectric layer 112, top dielectric layer 116 on or over center conductor 114, and conductive layer 118 on or over top dielectric layer 116. Any known processing techniques may be used to form first transmission line 110. In a representative embodiment substrate 100 may be a pre-manufactured PC board, hybrid package or IC chip already having first transmission line 110 formed thereon. Thereafter, first dielectric layer 132 may be subsequently printed over substrate 100 on ground plane 102 between first transmission line 110 and the designated location that second transmission line 120 is to be placed over substrate 100 on ground plane 102. First dielectric layer 132 may be formed as having a tapered cross-section along the plane extending from first transmission line 110 to the designated location for second transmission line 120, substantially without abrupt transitions in thickness or geometry. More particularly, at the interface between bottom dielectric layer 112 of first transmission line 110 and first dielectric layer 132, first dielectric layer 132 may have a first thickness or height from the surface of ground plane 102 that is substantially the same as the thickness or height of bottom dielectric layer 112 from ground plane 102. At the opposite end of first dielectric layer 132 that will be at the interface with second transmission line 120 when second transmission line 120 is subsequently placed at the designated location, first dielectric layer 132 may have a second thickness or height from the surface of ground plane 102 that is substantially the same as the height of protruding conductor portion 124 from the surface of ground plane 102. The thickness or height of first dielectric layer 132 may gradually change from the first thickness to the second thickness without abrupt transitions. In some representative embodiments the width of first dielectric layer 132 may also gradually change between first transmission line 110 and the designated location that second transmission line 120 is to be placed, such as shown in FIG. 4D where the width of first dielectric layer 132 gradually increases for example.

First dielectric layer 132 may be formed by three-dimensional (3D) printing. In a representative embodiment, the 3D printing may include first coating a corresponding powder (not shown) over substrate 100 The coated powder may then be melted by a laser scanned in the pattern desired to form a first layer of patterned dielectric. Substrate 100 and the first layer of patterned dielectric may then be coated with additional powder, and then melted by a laser scanned in the pattern desired to form a second layer of patterned dielectric. These sequential steps of coating and melting may be repeated with the laser scanning pattern changed so that first dielectric layer 132 when completely formed has a desired thickness at respective points along the plane extending laterally from first transmission line 110 to second transmission line 120. First dielectric layer 132 may thus be formed by 3D printing as having a tapered cross-section without abrupt transitions. First dielectric layer 132 may also be three-dimensionally printed to have a width that gradually changes by coating the powder and using a laser scanning pattern over a corresponding footprint necessary to provide the desired shape. In a further representative embodiment, first dielectric layer 132 may be 3D printed using a device that dispenses liquid in the pattern of first dielectric layer 132, whereby the dispensed liquid thereafter solidifies on substrate 100. The device can be scanned repeatedly to dispense liquid in areas corresponding to the desired shape and dimensions of first dielectric layer 132, in a manner similar to an ink jet printer.

Referring to FIG. 4B and FIG. 2, second transmission line 120 may then be placed at the designated location against first dielectric layer 132, with protruding conductor portion 124 of second transmission line 120 disposed on or over first dielectric layer 132. Thereafter, conductive layer 134 may be disposed on or over first dielectric layer 132. In a representative embodiment, conductive layer 134 may be disposed by 3D printing. Conductive layer 134 may or may not have tapered cross-section along the plane extending from first transmission line 110 to the second transmission line 120. That is, conductive layer 134 may be formed to have a thickness that gradually changes along a plane extending from first transmission line 110 to second transmission line 120, or conductive layer 134 may be formed to have a substantially constant thickness along a plane extending from first transmission line 110 to second transmission line 120. The width of conductive layer 134 may also gradually change along the plane extending from first transmission line 110 to second transmission line 120. In other representative embodiments, conductive layer 134 may be disposed by inserting a conductive wire on or over first dielectric layer 132. In still further representative embodiments, conductive layer 134 may be disposed by 3D printing within center channel 135 of first dielectric layer 132 (shown in FIG. 3B), or by inserting a conductive wire within center channel 135. Conductive layer 134 may extend onto bottom dielectric layer 112 and center conductor 114 of first transmission line 110. In other representative embodiments, dielectric 126 and outer conductive layer or sheath 128 may be removed from second transmission line 120, and the corresponding exposed portion of center conductor 122 may be disposed on first dielectric layer 132 replacing conductive layer 134.

Thereafter, conductive layer 134 may be electrically connected to a conductor of first transmission line 110 and a conductor of second transmission line 120. In this representative embodiment, conductive layer 134 is electrically connected to center conductor 114 by solder 133 which may be manually applied. In other representative embodiments conductive layer 134 may be electrically connected to center conductor 114 by three-dimensionally printing conductive material such as solder, gold, silver or copper, or by applying conductive epoxy. Conductive layer 134 may similarly be electrically connected to protruding conductor portion 124 by any of manually applied solder, 3D printing of conductive material or applied conductive epoxy.

Referring to FIG. 4C and FIG. 2, second dielectric layer 136 may be formed over or on conductive layer 134 and first dielectric layer 132, as well as over or on center conductor 114 and bottom dielectric layer 112 of first transmission line 110, solder 133 and ground plane 102. In a representative embodiment, second dielectric layer 136 may be formed by 3D printing. In other representative embodiments, second dielectric layer 136 may be dispensed or manually applied non-conductive epoxy. Second dielectric layer 136 may or may not have tapered cross-section along the plane extending from first transmission line 110 to the second transmission line 120. As may be appreciated in view of FIG. 3B, conductive layer 134 is substantially enclosed by first dielectric layer 132 and second dielectric layer 136.

Thereafter, shield layer 138 may be formed and configured to substantially enclose first dielectric layer 132, conductive layer 134 and second dielectric layer 136 over substrate 100 on ground plane 102. Shield layer 138 may be a conductive material dispensed or manually applied conductive epoxy. In representative embodiments, shield layer 138 may be formed by 3D printing. In representative embodiments, shield layer 138 overlaps onto first transmission line 110 and/or second transmission line 120, substantially enclosing at least portions of first transmission line 110 and/or second transmission line 120.

Thereafter, hold-down 104, as denoted by dashed lines in the cross-sectional views of FIGS. 4C and 2, may be formed to mechanically secure second transmission line 120 to substrate 100. In a representative embodiment, hold-down 104 may be formed by three-dimensionally printing dielectric over second transmission line 120 and over substrate 100 on ground plane 102, to secure second transmission line 120 to substrate 100. In other representative embodiments, hold-down 104 may be formed by applying non-conductive epoxy over second transmission line 120 and over substrate 100 on ground plane 102, to secure second transmission line 120 to substrate 100. As second transmission line 120 may be an RF cable, in further representative embodiments hold-down 104 may be formed by 3D printing of conductive material or by applying conductive epoxy, to electrically connect outer conductive layer or sheath 128 to ground plane 102. Although hold-down 104 is described as a final process step with reference to FIG. 4C, hold-down 104 may be formed at any time during the process after second transmission line 120 is placed at the designated location against first dielectric layer 132 as described with respect to FIG. 4B.

In some representative embodiments where less than optimum signal quality and performance may be acceptable, or in applications at lower frequencies, connection receptacle 130 may be configured as including first dielectric layer 132 and conductive layer 134, without second dielectric layer 136 and shield layer 138. Such a configuration may be characterized as corresponding to the cross-sectional view shown in FIG. 4B.

FIG. 4D is a top perspective view of the structure shown in FIG. 4B. In this particular embodiment as shown, the width of first dielectric layer 132 and the width of conductive layer 134 both gradually increase along a plane extending from first transmission line 110 to second transmission line 120, without abrupt transitions. As should be appreciated, the width of either or both of first dielectric layer 132 and conductive layer 134 may gradually change along the plane extending from first transmission line 110 to second transmission line 120.

In accordance with the representative embodiments described with respect to FIGS. 1-4D, because first dielectric layer 132 is configured as having a tapered cross-section along the plane extending from first transmission line 110 to the second transmission line 120 so that thickness gradually changes, and in other representative embodiments may also have a width that gradually changes, conductive layer 134 may consequently be provided between first and second transmission lines 110 and 120 without abrupt transitions, discontinuities or bends. A smooth, gradual transition may be provided between first and second transmission lines 110 and 120. Degradation of signals across connection receptacle 130 may be minimized and improved signal quality may be maintained.

Figure 5:
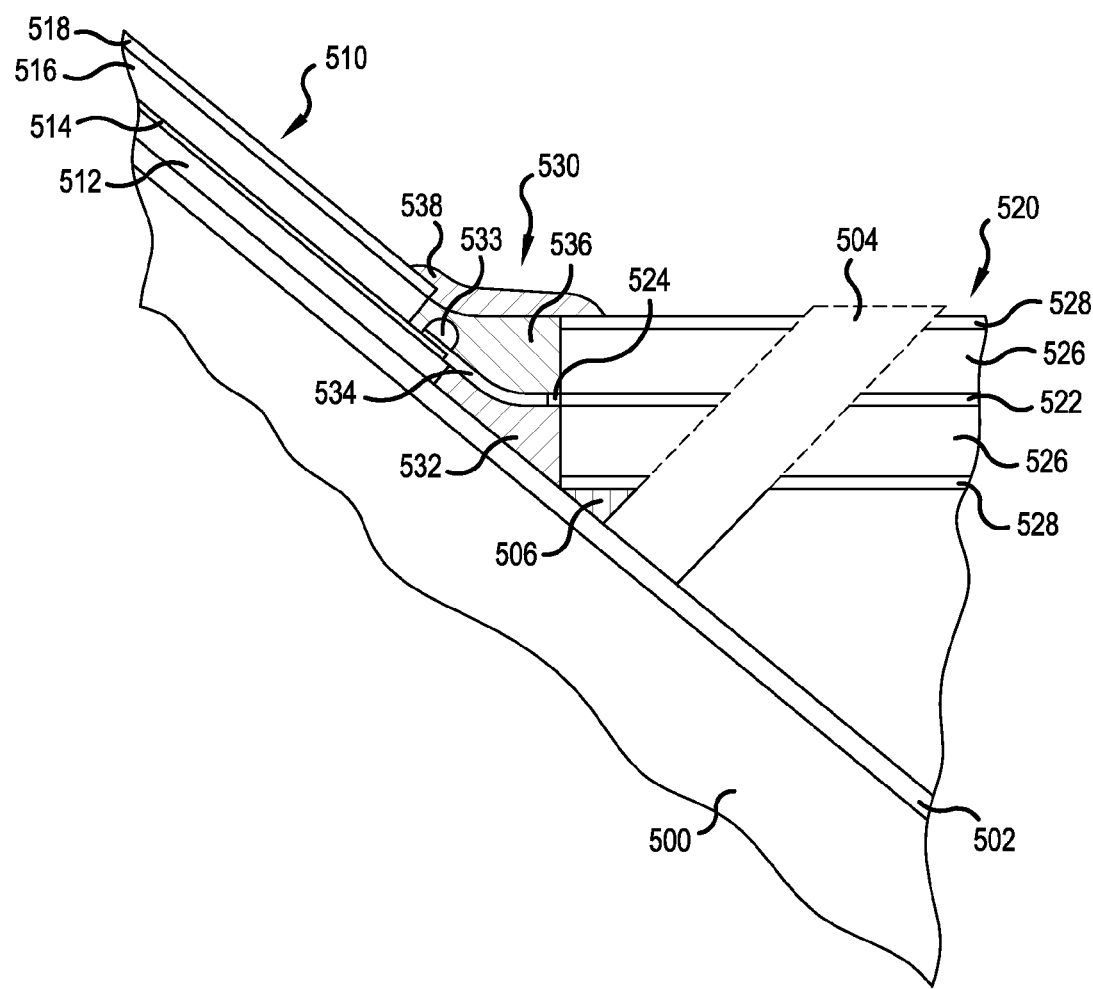
FIG. 5 is a cross-sectional view illustrating a connection receptacle between a first transmission line and a second transmission line, according to a representative embodiment.

FIG. 5 is a cross-sectional view illustrating connection receptacle 530 between first transmission line 510 and second transmission line 520, according to a representative embodiment. FIG. 5 includes similar components with similar reference numerals as shown and described with respect to FIG. 2. Detailed description of such similar components may be omitted from the following.

Referring to FIG. 5, first transmission line 510, connection receptacle 530 and second transmission line 520 are disposed on or over substrate 500. In a representative embodiment, substrate 500 may be a printed circuit (PC) board, a hybrid package, or an integrated circuit (IC) chip. In a representative embodiment, ground plane 502 may be disposed on an upper surface of substrate 500. In the representative embodiment as shown in FIG. 5, first transmission line 510 is a quasi-coaxial structure configured as including bottom dielectric layer 512 on or over ground plane 502, center conductor 514 on or over bottom dielectric layer 512, top dielectric layer 516 on or over center conductor 514, and conductive layer 518 on or over top dielectric layer 516. Conductive layer 518 may be electrically connected to ground plane 502. In some representative embodiments first transmission line 510 may be provided without conductive layer 518. In this representative embodiment, second transmission line 520 is a radio frequency (RF) cable including a center conductor 522 which is surrounded by dielectric 526, and an outer conductive layer or sheath 528 surrounding dielectric 526. Center conductor 522 may extend out from second transmission line 520 as protruding conductor portion 524. Second transmission line 520 may be laterally spaced away from first transmission line 510. In a representative embodiment hold-down 504, as shown by dashed lines in this cross-sectional view, may be included and configured to mechanically secure second transmission line 520 to substrate 500.

Referring further to FIG. 5, connection receptacle 530 is disposed over substrate 500 on ground plane 502, between first and second transmission line 510 and 520. Connection receptacle 530 includes first dielectric layer 532 on or over ground plane 502, conductive layer 534 on or over first dielectric layer 532, and second dielectric layer 536 on or over first dielectric layer 532 and conductive layer 534. First dielectric layer 532 has a tapered cross-section along a plane extending from first transmission line 510 to the second transmission line 520. That is, the thickness of first dielectric layer 532 may gradually change along a lateral direction from first transmission line 510 to second transmission line 520, without abrupt transitions. In FIG. 5, the thickness of first dielectric layer 532 gradually increases along a lateral direction from first transmission line 510 to second transmission line 520. In other representative embodiments, the width of first dielectric layer 532 may also gradually change along a lateral direction between first transmission line 510 and second transmission line 520, in a somewhat similar manner as first dielectric layer 132 described with reference to FIG. 4D. Also, in some representative embodiments second dielectric layer 536 may have a tapered cross-section along the plane extending from first transmission line 510 to the second transmission line 520. That is, the thickness of second dielectric layer 536 may gradually change along a lateral direction from first transmission line 510 to second transmission line 520, without abrupt transitions. The width of second dielectric layer 536 may also gradually change along a lateral direction between first transmission line 510 and second transmission line 520 without abrupt transitions. In other representative embodiments, second dielectric layer 536 may not have a tapered cross-section. That is, in other representative embodiments the width and/or thickness of second dielectric layer 536 may be substantially constant and may not vary.

Conductive layer 534 is electrically connected to the exposed portion of center conductor 514 of first transmission line 510 and is electrically connected to protruding conductor portion 524 of second transmission line 520. Also, conductive layer 534 may have a tapered cross-section along the plane extending from first transmission line 510 to the second transmission line 520. That is, the thickness of conductive layer 534 may gradually change along a lateral direction from first transmission line 510 to second transmission line 520, without abrupt transitions. In other representative embodiments the width of conductive layer 534 may gradually change along a lateral direction between first transmission line 510 and second transmission line 520 without abrupt transitions, in a somewhat similar manner as conductive layer 134 described with reference to FIG. 4D. In other representative embodiments, conductive layer 534 may not have a tapered cross-section. That is, in other representative embodiments the width and/or thickness of conductive layer 534 may be substantially constant and may not gradually change.

Referring further to FIG. 5, shield layer 538 is disposed on second dielectric layer 536. In a representative embodiment, shield layer 538 may overlap onto first transmission line 510 and/or second transmission line 520. Shield layer 538 is configured to substantially enclose first dielectric layer 532, conductive layer 534 and second dielectric layer 536 on or over substrate 500, and to be electrically connected to ground plane 502. Shield layer 538 may also be electrically connected to conductive layer 518 and outer conductive layer or sheath 528. In a representative embodiment, shield layer 538 may also substantially enclose at least portions of first transmission line 510 and/or second transmission line 520 on or above substrate 500. Shield layer 538 may be conductive, or in other representative embodiments may be non-conductive.

In contrast to the embodiment as described with respect to FIG. 2, second transmission line 520 (which is an RF cable in this representative embodiment) is placed over substrate 500 on ground plane 502 at an angle with respect to an upper planar surface of substrate 500. In a representative embodiment the angle may be 45 degrees, or any suitable angle. Step structure 506 is formed over substrate 500 on ground plane 502 prior to placement of transmission line 520 over substrate 500. Step structure 506 is configured to mechanically support and hold second transmission line 520 (RF cable) in place. Step structure 506 may be formed by 3D printing. In a representative embodiment step structure 506 may be an electrically conductive material such as metal, and may thus electrically connect ground plane 502 to outer conductive layer or sheath 528 of second transmission line 520 (RF cable). In other representative embodiments, step structure 506 may be a non-conductive material or dielectric.

Figure 6:
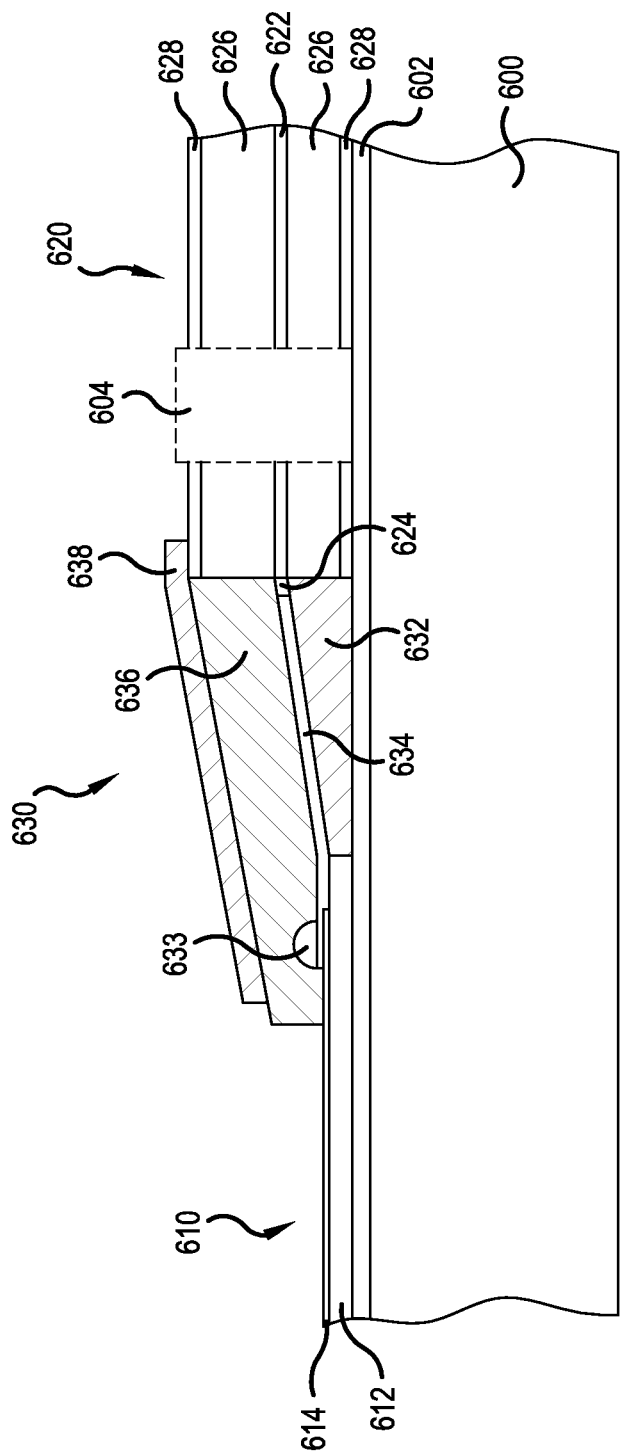
FIG. 6 is a cross-sectional view illustrating the connection receptacle, the first transmission line and the second transmission line, according to another representative embodiment.

FIG. 6 is a cross-sectional view illustrating connection receptacle 630, first transmission line 610 and second transmission line 620, according to another representative embodiment. The structure shown in FIG. 6 includes similar elements as shown in FIG. 2 and similar reference numerals. Detailed description of such similar components may be omitted from the following.

Referring to FIG. 6, a main difference between the structure shown in FIG. 6 as compared to the structure shown in FIG. 2 is that the structure shown in FIG. 6 includes a microstrip or co-planar waveguide as first transmission line 610 instead of a quasi-coaxial structure. As shown in FIG. 6, first transmission line 610, connection receptacle 630 and second transmission line 620 are disposed on or over substrate 600. In a representative embodiment, ground plane 602 may be disposed on an upper surface of substrate 600.

As shown in FIG. 6, first transmission line 610 is disposed over substrate 600 on ground plane 602. In the representative embodiment as shown in FIG. 6, first transmission line 610 is a microstrip or co-planar waveguide configured as including bottom dielectric layer 612 on or over ground plane 602, and conductor 614 on or over bottom dielectric layer 612. Because first transmission line 610 is a microstrip or co-planar waveguide, a top dielectric layer and/or a conductive layer such as top dielectric layer 116 and conductive layer 118 shown in FIG. 2 are not included.

As further shown in FIG. 6, second transmission line 620 is also disposed over substrate 600 on ground plane 602. In this representative embodiment, second transmission line 620 is a radio frequency (RF) cable including a center conductor 622 which is surrounded by dielectric 626, and an outer conductive layer or sheath 628 surrounding dielectric 626. The outer conductive layer or sheath 628 may be electrically connected to ground. Protruding conductor portion 624 extends from second transmission line 620. Second transmission line 620 may be laterally spaced away from first transmission line 610. In a representative embodiment hold-down 604, as shown by dashed lines in this cross-sectional view, may be included and configured to mechanically secure second transmission line 620 to substrate 600.

Referring further to FIG. 6, connection receptacle 630 is disposed over substrate 600 on ground plane 602, between first and second transmission lines 610 and 620. Connection receptacle 630 includes first dielectric layer 632 on or over ground plane 602, conductive layer 634 on or over first dielectric layer 632, and second dielectric layer 636 on or over first dielectric layer 632 and conductive layer 634. Conductive layer 634 has first and second ends respectively electrically connected to a conductor of first transmission line 610 and a conductor of second transmission line 620. First dielectric layer 632 has a tapered cross-section along a plane extending from first transmission line 610 to the second transmission line 620. That is, the thickness (or height) of first dielectric layer 632 may gradually change along a lateral direction from first transmission line 610 to second transmission line 620, minimizing abrupt transitions. As shown in FIG. 6, the thickness of first dielectric layer 632 gradually increases along the lateral direction from first transmission line 610 to second transmission line 620 due to the different respective geometries of first and second transmission lines 610 and 620. Also, in some representative embodiments second dielectric layer 636 may have a tapered cross-section along the plane extending from first transmission line 610 to the second transmission line 620. That is, the thickness (or height) of second dielectric layer 636 may gradually change along a lateral direction from first transmission line 610 to second transmission line 620, minimizing abrupt transitions. In other representative embodiments, second dielectric layer 636 may not have a tapered cross-section. In some representative embodiments any or all of the respective widths of first dielectric layer 632, conductive layer 634 and second dielectric layer 636 may gradually change, such as described with reference to the corresponding elements of FIG. 4D.

In a representative embodiment, first dielectric layer 632 may have a center channel (such as center channel 135 shown in FIG. 3B) disposed along a top surface and extending laterally between first transmission line 610 and second transmission line 620. Conductive layer 634 may be disposed within the corresponding center channel. Conductive layer 634 is electrically connected to conductor 614 of first transmission line 610 and is electrically connected to protruding conductor portion 624 of second transmission line 620. Also, although not necessary, conductive layer 634 may have a tapered cross-section along the plane extending from first transmission line 610 to the second transmission line 620. That is, the thickness of conductive layer 634 may gradually change along a lateral direction from first transmission line 610 to second transmission line 620, without abrupt transitions. Also, the width of conductive layer 634 may gradually change in a similar manner as corresponding conductive layer 134 shown in FIG. 4D for example. In other representative embodiments, conductive layer 634 may not have a tapered cross-section.

Referring further to FIG. 6, shield layer 638 is disposed on second dielectric layer 636. In a representative embodiment, shield layer 638 may overlap onto second transmission line 620. Shield layer 638 is configured to substantially enclose first dielectric layer 632, conductive layer 634 and second dielectric layer 636 on or over substrate 600. In a representative embodiment, shield layer 638 may also substantially enclose at least a portion of second transmission line 620 on or above substrate 600. Shield layer 638 may be a conductive metal and may also be electrically connected to outer conductive layer or sheath 628. In other representative embodiments, shield layer 638 may be electrically non-conductive.

Figure 7A:
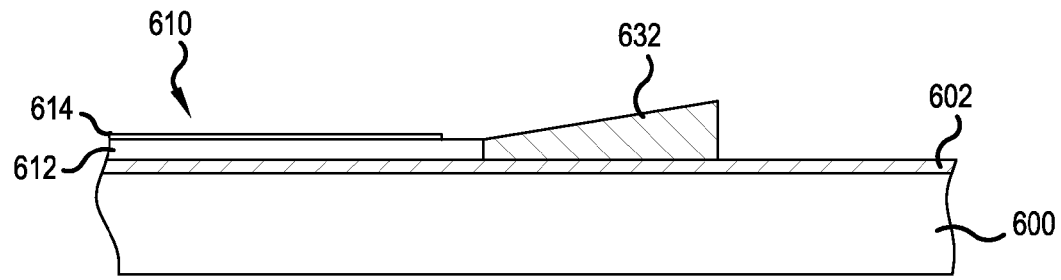
FIGS. 7A-7C are cross-sectional views illustrating a method of forming a connection receptacle over a substrate between a first transmission line and a second transmission line, according to a representative embodiment.
Figure 7B:
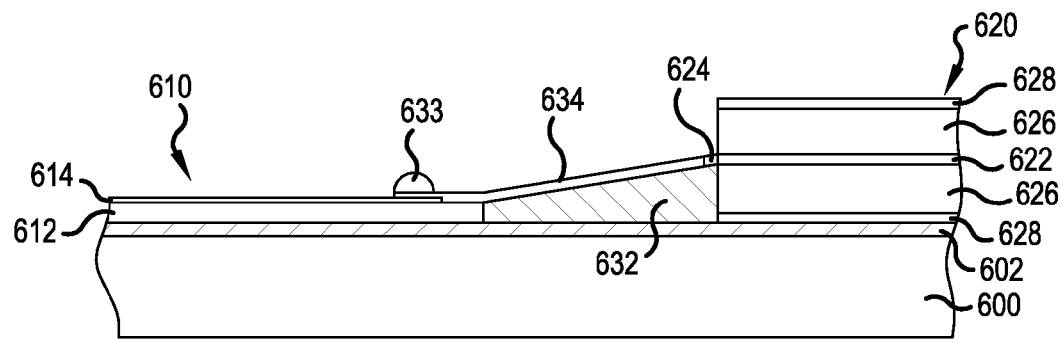
Figure 7C:
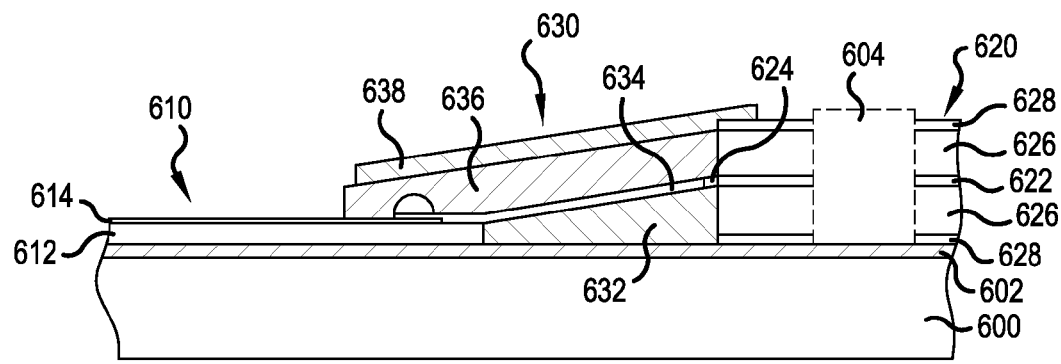

FIGS. 7A-7C are cross-sectional views illustrating a method of forming connection receptacle 630 over substrate 600 between first transmission line 610 and second transmission line 620, according to a representative embodiment. The structures shown in FIG. 7A-7C include similar elements as shown in respective FIGS. 4A-4D, and detailed description of such similar components and processing may be omitted from the following.

Referring to FIG. 7A and FIG. 6, first transmission line 610 may be formed over substrate 600 on ground plane 602. In this representative embodiment, first transmission line 610 is a microstrip or co-planar waveguide which may be formed by sequentially and repeatedly screen printing and firing thick film materials, or by depositing, patterning and etching corresponding layers to form bottom dielectric layer 612 over substrate 600 on ground plane 602, and conductor 614 on or over bottom dielectric layer 612. In a representative embodiment substrate 600 may be a pre-manufactured PC board, hybrid package or IC chip already having first transmission line 610 formed thereon. Thereafter, first dielectric layer 632 may be subsequently printed over substrate 600 on ground plane 602 between first transmission line 610 and the designated location that second transmission line 620 is to be placed over substrate 600 on ground plane 602. First dielectric layer 632 may be formed as having a tapered cross-section along the plane extending from first transmission line 610 to the designated location for second transmission line 620, substantially without abrupt transitions in thickness or geometry, in a manner as described with reference to FIG. 4A. The thickness or height of first dielectric layer 632 may gradually change from the first thickness to the second thickness without abrupt transitions. In some representative embodiments the width of first dielectric layer 632 may also gradually change between first transmission line 610 and the designated location that second transmission line 620 is to be placed. First dielectric layer 632 may be formed by three-dimensional (3D) printing, in a similar manner as first dielectric layer 132 described with reference to FIG. 4A. First dielectric layer 632 may also be 3D printed to have a width that gradually changes.

Referring to FIG. 7B and FIG. 6, second transmission line 620 may then be placed at the designated location against first dielectric layer 632, with protruding conductor portion 624 of second transmission line 620 disposed on or over first dielectric layer 632. Thereafter, conductive layer 634 may be disposed on or over first dielectric layer 632. In a representative embodiment, conductive layer 634 may be disposed by 3D printing. Conductive layer 634 may or may not have tapered cross-section along the plane extending from first transmission line 610 to the second transmission line 620. The width of conductive layer 634 may also gradually change along the plane extending from first transmission line 610 to second transmission line 620. In other representative embodiments, conductive layer 634 may be disposed by inserting a conductive wire on or over first dielectric layer 632. In still further representative embodiments, conductive layer 634 may be disposed by 3D printing within a center channel of first dielectric layer 632 (shown in FIG. 3B), or by inserting a conductive wire within a channel. Conductive layer 634 may extend onto bottom dielectric layer 612 and conductor 614 of first transmission line 610. In other representative embodiments, dielectric 626 and outer conductive layer or sheath 628 may be removed from second transmission line 620, and the corresponding exposed portion of center conductor 622 may be disposed on first dielectric layer 632 replacing conductive layer 634.

Thereafter, conductive layer 634 may be electrically connected to first transmission line 610 and second transmission line 620. In this representative embodiment, conductive layer 634 is electrically connected to conductor 614 by solder 633. In other representative embodiments conductive layer 634 may be electrically connected to conductor 614 by 3D printing of conductive material or by applying conductive epoxy. Conductive layer 634 may similarly be electrically connected to protruding conductor portion 624 by any of manually applied solder, 3D printing of conductive material or applied conductive epoxy.

Referring to FIG. 7C and FIG. 6, second dielectric layer 636 may be formed over or on conductive layer 634 and first dielectric layer 632, as well as over or on conductor 614 and bottom dielectric layer 612 of first transmission line 610, solder 633 and ground plane 602. In a representative embodiment, second dielectric layer 636 may be formed by 3D printing. In other representative embodiments, second dielectric layer 636 may be dispensed or manually applied non-conductive epoxy. Second dielectric layer 636 may or may not have tapered cross-section along the plane extending from first transmission line 610 to the second transmission line 620. Conductive layer 634 may be substantially enclosed by first dielectric layer 632 and second dielectric layer 636.

Thereafter, shield layer 638 may be formed and configured to substantially enclose first dielectric layer 632, conductive layer 634 and second dielectric layer 636 over substrate 600 on ground plane 602. Shield layer 638 may be a conductive material dispensed or manually applied conductive epoxy. In representative embodiments, shield layer 638 may be formed by 3D printing. Shield layer 638 may also overlap onto second transmission line 620, substantially enclosing at a least portion of second transmission line 620. Thereafter, hold-down 604, as denoted by dashed lines in the cross-sectional views of FIGS. 7C and 6, may be formed by 3D printing to mechanically secure second transmission line 620 to substrate 600. As second transmission line 620 may be an RF cable, hold-down 604 may be formed by 3D printing of conductive material or by applying conductive epoxy, to electrically connect outer conductive layer or sheath 628 to ground plane 602. Although hold-down 604 is described as a final process step with reference to FIG. 7C, hold-down 604 may be formed at any time during the process after second transmission line 620 is placed at the designated location against first dielectric layer 632 as described with respect to FIG. 7B.

In some representative embodiments where less than optimum signal quality and performance may be acceptable, or in applications at lower frequencies, connection receptacle 630 may be configured as including first dielectric layer 632 and conductive layer 634, without second dielectric layer 636 and shield layer 638. Such a configuration may be characterized as corresponding to the cross-sectional view shown in FIG. 7B.

In accordance with the representative embodiments described with respect to FIGS. 6-7C, a smooth, gradual transition may be provided between first transmission line 610 which may be a microstrip or co-planar waveguide, and second transmission line 620 which may be an RF cable. Degradation of signals across connection receptacle 630 may be minimized and improved signal quality may be maintained.

While specific embodiments are disclosed herein, many variations are possible, which remain within the concept and scope of the present teachings. For example, the various embodiments described with respect to FIGS. 1-4D include connection receptacle 130 configured to provide electrical connection between first transmission line 110 which may be a quasi-coaxial structure, a co-planar waveguide, a microstrip or a stripline, and second transmission line 120 which may be an RF cable. In other representative embodiments, second transmission line 120 may also be any of a quasi-coaxial structure, a co-planar waveguide, a microstrip or a stripline, instead of an RF cable. In still further representative embodiments, connection receptacle 130 may be configured to electrically connect a first RF cable to a second RF cable.

The phrase "and/or," as used herein in the specification and in the claims, should be understood to mean "either or both" of the elements so conjoined. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The various components, materials, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

Therefore the invention should not be limited to the particular example embodiments described in detail above.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

What is claimed is:

1. A method of forming a connection receptacle over a substrate, the method comprising:
   printing a first dielectric layer over the substrate between first and second transmission lines, the first dielectric layer comprising a tapered cross-section along a plane extending from the first transmission line to the second transmission line;
   disposing a conductive layer over the printed first dielectric layer;
   electrically connecting the conductive layer to a conductor of the first transmission line and a conductor of the second transmission line; and
   forming a shield layer configured to enclose the printed first dielectric layer, the conductive layer and the second dielectric layer on the substrate, the shield layer electrically connected to outer conductive layers of the first and second transmission lines.

2. The method of claim 1, further comprising forming a second dielectric layer over the conductive layer and the first dielectric layer.

3. The method of claim 2, wherein the second dielectric layer comprises a tapered cross-section along the plane extending from the first transmission line to the second transmission line.

4. The method of claim 2, wherein said forming a second dielectric layer and said forming a shield layer comprises three-dimensional printing.

5. The method of claim 1, wherein the conductive layer comprises a tapered cross-section along the plane extending from the first transmission line to the second transmission line.

6. The method of claim 1, wherein said disposing a conductive layer comprises three-dimensionally printing the conductive layer over the printed first dielectric layer.

7. The method of claim 1, wherein said disposing a conductive layer comprises inserting a conductive wire over the printed first dielectric layer.

8. The method of claim 7, further comprising forming a center channel in the printed first dielectric layer, said disposing a conductive wire comprises inserting the conductive wire into the center channel.

9. The method of claim 1, further comprising printing a step structure over the substrate, the step structure configured to hold the second transmission line in place, wherein the step structure comprises dielectric.

10. The method of claim 1, wherein said electrically connecting comprises three-dimensionally printing conductive material to connect the conductors of the first and second transmission lines to the conductive layer.

11. The method of claim 1, further comprising forming a hold-down to secure the second transmission line to the substrate.

12. The method of claim 11, wherein said forming a hold-down comprises three-dimensionally printing dielectric over the second transmission line and the substrate to secure the second transmission line to the substrate.

* * * * *